United States Patent
Tsuchiya et al.

(10) Patent No.: US 10,007,436 B2
(45) Date of Patent: Jun. 26, 2018

(54) STORAGE CONTROL APPARATUS AND CONTROL METHOD OF STORAGE CONTROL APPARATUS

(71) Applicant: FUJITSU LIMITED, Kawasaki-shi, Kanagawa (JP)

(72) Inventors: Yoshihiro Tsuchiya, Yokohama (JP); Takashi Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 310 days.

(21) Appl. No.: 14/861,159

(22) Filed: Sep. 22, 2015

(65) Prior Publication Data

US 2016/0011789 A1    Jan. 14, 2016

Related U.S. Application Data

(63) Continuation of application No. PCT/JP2014/058352, filed on Mar. 25, 2014.

(30) Foreign Application Priority Data

Mar. 29, 2013 (JP) ................................ 2013-074642

(51) Int. Cl.
G06F 13/00 (2006.01)
G06F 3/06 (2006.01)

(52) U.S. Cl.
CPC .......... G06F 3/0608 (2013.01); G06F 3/0641 (2013.01); G06F 3/0652 (2013.01); G06F 3/0673 (2013.01); G06F 3/0674 (2013.01)

(58) Field of Classification Search
CPC ...... G06F 12/1491; G06F 5/017; G06F 12/12; G06F 12/121; G06F 12/1018; G11C 19/00

(Continued)

(56) References Cited

U.S. PATENT DOCUMENTS 8,527,482 B2 * 9/2013 Heller ................. G06F 17/3015
707/699
2003/0200393 A1 * 10/2003 Cornaby ............. G06F 12/0862
711/118

(Continued)

FOREIGN PATENT DOCUMENTS

JP    2010-114480    5/2010
JP    2011-118712    6/2011

(Continued)

OTHER PUBLICATIONS

International Search Report dated May 27, 2014 in corresponding international application PCT/JP2014/058352.

(Continued)

*Primary Examiner* — Sean D Rossiter
(74) *Attorney, Agent, or Firm* — Staas & Halsey LLP

(57) ABSTRACT

A storage control apparatus includes a memory, and a processor. The memory is configured to retain associative relation information for managing an associative relation between a hash value associated with a first address being inputted and a second address as an address of the storage device, filter information containing Bloom filters, and overlap count management information. The processor executes a process that causes the storage control apparatus to perform first storing the storage target data in the storage device without being registered in the filter information, second storing the storage target data in the storage device as well as registering the storage target data in the filter information, performing neither registering the storage target data in the filter information nor storing the storage target data in the storage device and deleting deletable data from the storage device.

10 Claims, 16 Drawing Sheets

(58) Field of Classification Search
USPC .................. 711/163, E12.097, 110, 133
See application file for complete search history.

(56) References Cited

U.S. PATENT DOCUMENTS

| | | | |
|---|---|---|---|
| 2003/0208661 A1* | 11/2003 | Magoshi | G06F 9/30043 711/144 |
| 2005/0132139 A1* | 6/2005 | Agaram | G06F 9/383 711/128 |
| 2009/0307251 A1* | 12/2009 | Heller | G06F 17/3015 |
| 2011/0029496 A1* | 2/2011 | Flynn | G06F 3/061 707/696 |
| 2011/0131375 A1* | 6/2011 | Noeldner | G06F 12/00 711/114 |
| 2011/0138144 A1 | 6/2011 | Tamura et al. | |
| 2011/0225182 A1 | 9/2011 | Tsuchiya et al. | |
| 2012/0317130 A1 | 12/2012 | Watanabe et al. | |
| 2014/0156973 A1* | 6/2014 | Suzuki | G06F 9/322 712/205 |
| 2016/0011788 A1* | 1/2016 | Tsuchiya | G06F 3/0608 711/154 |

FOREIGN PATENT DOCUMENTS

| | | |
|---|---|---|
| JP | 2011-186954 | 9/2011 |
| JP | 2013-003653 | 1/2013 |

OTHER PUBLICATIONS

Tsuchiya et al., "DBLK: Deduplication for Primary Block Storage", Mass Storage Systems and Technologies (MSST), 2011 IEEE 27th Symposium, pp. 1-5.

Katsurashima, "World of Storage Innovated by Deduplication Technology", ASCII. Technologies, Jan. 2011 Issue, vol. 16, No. 1, pp. 108-115.

"Progress in Deduplication Technology as seen in Hitachi Capacity Optimization", Hitachi Storage Magazine vol. 9, pp. 10-11.

* cited by examiner

| | NORMAL OVERLAP ELIMINATION | EXTENDED OVERLAP ELIMINATION | |
|---|---|---|---|
| | | BEFORE POST-PROCESSING | AFTER POST-PROCESSING |
| MANAGEMENT DATA SIZE | P+L(1-P) | P | P |
| REDUCTION QUANTITY | (L-1)P | (L-3)P | (L-1)P |
| REDUCTION QUANTITY/ MANAGEMENT DATA SIZE | (L-1)P/(P+(1-P)) | L-3 | L-1 |

STORAGE CONTROL APPARATUS AND CONTROL METHOD OF STORAGE CONTROL APPARATUS

CROSS-REFERENCE TO RELATED APPLICATION

This application is a continuation application of International Application PCT/JP2014/058352 filed on Mar. 25, 2014 and designated the U.S. and this application is based upon and claims the benefit of priority of the prior Japanese Patent Application No. 2013-074642, filed on Mar. 29, 2013, the entire contents of which are incorporated herein by reference.

FIELD

The embodiments discussed herein are related to a storage control apparatus and a control method of the storage control apparatus.

BACKGROUND

Known as a technology of effectively making use of a storage capacity of a storage device (storage) is a technology, called data overlap elimination, overlap exclusion and other equivalent nomenclatures, of not storing overlapped data in the storage device. The apparatus performing the data overlap elimination involves normally using Bloom filters and a multi-layer Bloom filter (refer to, e.g., Patent Documents 1, 2) for determining whether data are overlapped.

The Bloom filters and the multi-layer Bloom filter (which will hereinafter be generically termed the Bloom filter(s)) are each defined as a data structure disabled from acquiring a desired false-positive occurrence probability unless a size of the Bloom filter is set corresponding to a data count of management target data. Considering that the Bloom filter is management data used for determining whether an overlap exists, it follows that the technology of performing the overlap elimination is desired to have a large data reduction quantity (a total size of the data subjected to the overlap elimination by using the management data) per unit management data size.

DOCUMENTS OF PRIOR ARTS

Patent Documents

[Patent Document 1] Japanese Laid-open Patent Publication No. 2011-186954
[Patent Document 2] Japanese Laid-open Patent Publication No. 2010-114480

SUMMARY

A storage control apparatus to control a storage device according to one aspect of the technology of the disclosure includes a memory and a processor. The memory is configured to retain associative relation information for managing an associative relation between a hash value associated with a first address being inputted and a second address as an address of the storage device, filter information containing Bloom filters and overlap count management information for managing an overlap count of respective sets of data stored in the storage device. The processor executes a process that causes the storage control apparatus to perform first storing a storage target data in the storage device without being registered in the filter information as well as incrementing the overlap count by "1" when the storage target data instructed to be stored in the storage device is of a first data type representing data with the overlap count being smaller than "N" (N is a natural number), the overlap count being specified by the overlap count management information, second storing the storage target data in the storage device as well as registering the storage target data in the filter information when the storage target data is the data with the overlap count specified by the overlap count management information being equal to or larger than "N" and is of a second data type representing data not registered in the filter information, performing neither registering the storage target data in the filter information nor storing the storage target data in the storage device when the storage target data is data with the overlap count specified by the overlap count management information being equal to or larger than "N" and is of a third data type representing management target data of the filter information and deleting deletable data from the storage device, the deletable data being specified from among data stored in the storage device, the deletable data having a content, the content being left in the storage device when the deletable data is deleted from the storage device.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 9 is an explanatory diagram of a multi-layer Bloom filter;
FIG. 15 is an explanatory diagram of a relation between a management data size, a reduction quantity and a reduction quantity/management data size when conducting normal overlap elimination and when conducting the overlap elimination by the storage control apparatus.

DESCRIPTION OF EMBODIMENTS

An in-depth description of a storage control apparatus 10 according to one embodiment of a technology of the disclosure will be made with reference to the drawings.

At first, a configuration and a usage mode of the storage control apparatus 10 will be described by using FIG. 1.

Figure 1:
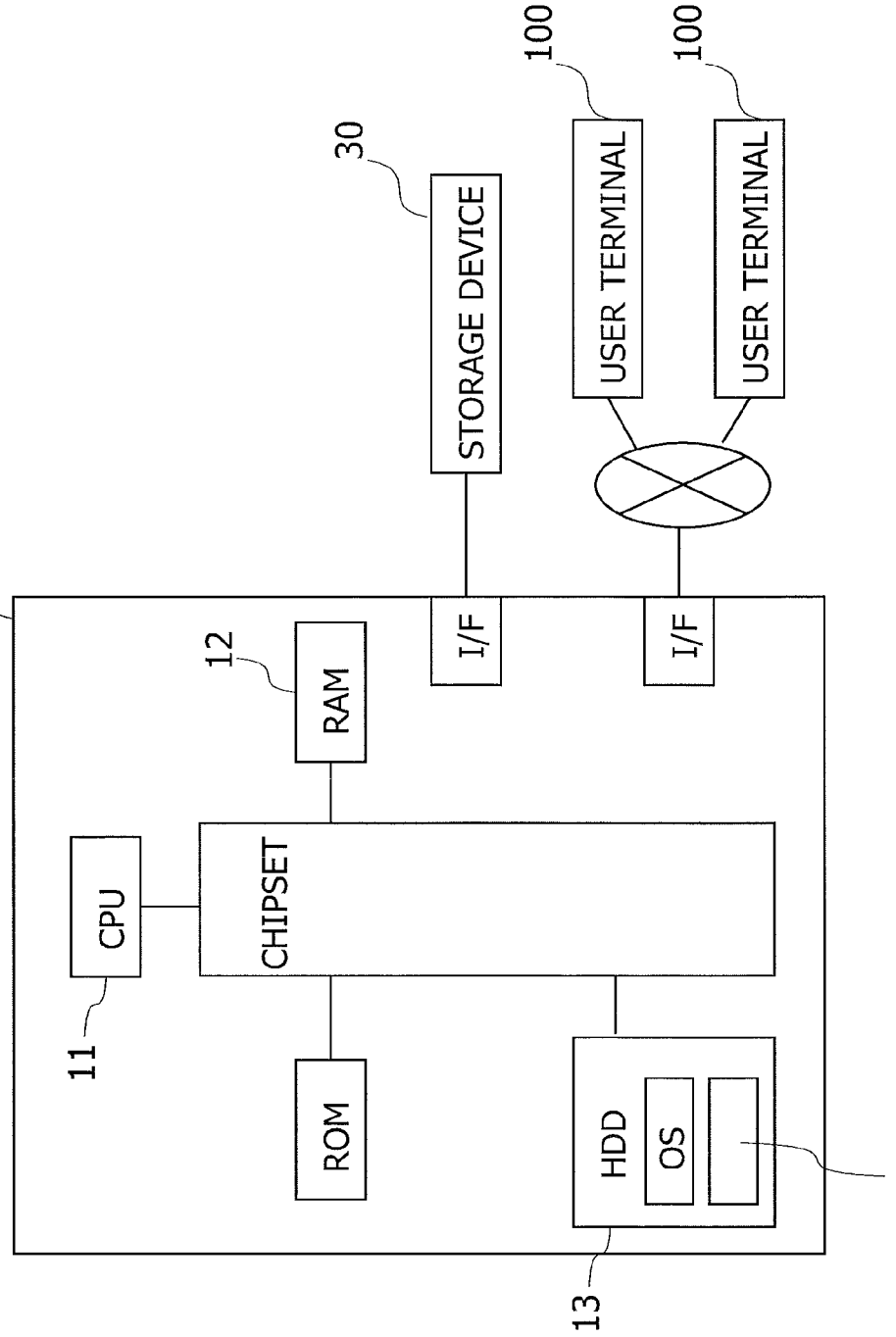
FIG. 1 is an explanatory diagram of a configuration and a usage mode of a storage control apparatus according to an embodiment.

As illustrated in FIG. 1, the storage control apparatus 10 according to the embodiment is an apparatus configured by installing OS (Operating System), a storage control program 18 and other equivalent software into a HDD (Hard Disk Drive) 13 of a computer 50. In other words, the storage control apparatus 10 is the computer 50, of which the CPU 11 loads the storage control program 18 and other equivalent software on to a RAM (Random Access Memory) 12, and executes the loaded control program 18.

The computer 50 installed with the storage control program 18 is an ordinary computer. Therefore, the storage control apparatus 10 (computer 50) includes, though omitting detailed descriptions of the respective components, a flash ROM (Read Only Memory notated by "ROM" in FIG. 1) that stores firmware instanced by IPL (Initial Program Loader) and other equivalent firmware. The storage control apparatus 10 further includes a chipset (i.e., one integrated circuit or a plurality of integrated circuits interconnected via a bus) via which the respective components are interconnected.

The storage control apparatus 10 still further includes a communication interface ("I/F") for performing communications with a storage device 30, and another communication interface ("I/F") for performing communications with at least one user terminal 100.

The storage device 30 connected to the storage control apparatus 10 is a device having a plurality of physical blocks (unit storage areas) for storing data and being capable of designating a physical block to read/write the data by a Physical Block Address (PBA). A device instanced by the HDD and an SSD (Solid State Drive) or configured by combining a plurality of HDDs and/or SSDs, is connected as the storage device 30 to the storage control apparatus 10.

Next, a supposed usage environment and basic processing of the storage control apparatus 10 will be explained. Note that the data in the following discussion connotes in principle the data having a size, which can be stored in one physical block of the storage device 30.

The storage control apparatus 10 is the apparatus developed on the assumption of being used in an environment where multiple items of information with only a part of contents being different are stored in the storage device 30. Herein, the phrase "the multiple items of information with only a part of contents being different" represents information instanced by L-pieces of information schematically depicted in FIG. 2, i.e., the pieces of information being coincident in content of a rate P field with each other but different in content of a rate 1−P field from each other.

Then, the storage control apparatus 10 is the apparatus basically configured to eliminate overlapped data by managing what items of data are stored in the storage device 30 while using a Multi Blume Filter (MBF).

However, the storage control apparatus 10 is configured as an apparatus that stores, when storing the data in the storage device 30, overlapped data up to N−1 (N≥2)-th data without eliminating these overlapped data in the storage device 30, but eliminates the overlapped data from the N-th data onward.

Herein, the n-th (n is a natural number) overlapped data connotes the data having the same content as the content of the (n−1)th data being stored in the storage device 30. In other words, the first overlapped data connotes the data having a new content, which is stored in the storage device 30 for the first time.

The configuration and operations of the storage control apparatus 10 will hereinafter be specifically described based on the assumption of what has been discussed so far.

Figure 3:
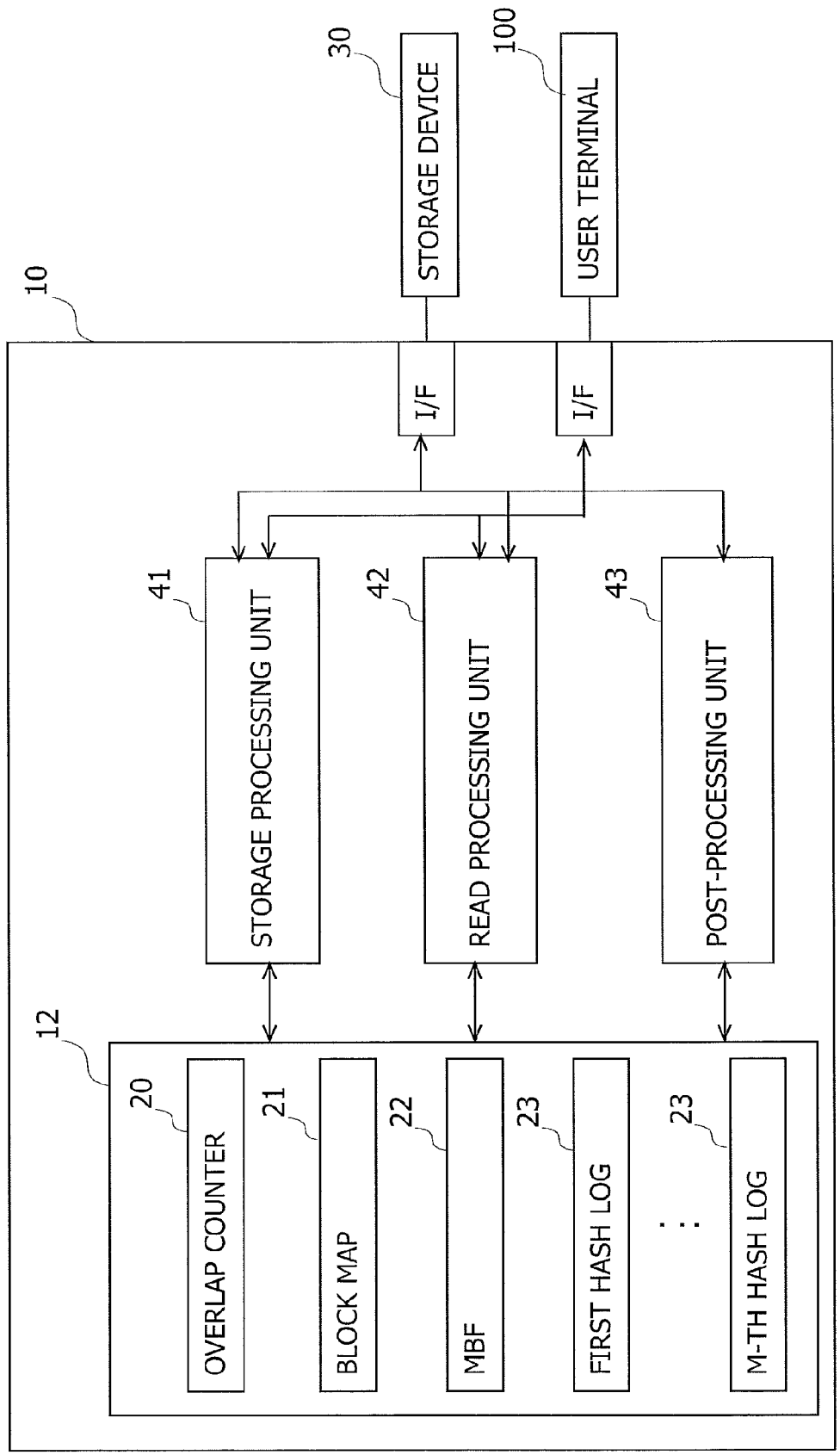
FIG. 3 is a processing block diagram of the storage control apparatus.

FIG. 3 illustrates a processing block diagram of the storage control apparatus 10. As illustrated in FIG. 3, the storage control apparatus 10 includes a storage processing unit 41, a read processing unit 42 and a post-processing unit 43. The storage control apparatus 10 further operates in such a status that an overlap counter 20, a block map 21, a MBF 22 and hash logs 23 from a first hash log 23 to an m-th hash log 23 exist on the RAM 12.

The storage processing unit 41, the read processing unit 42 and the post-processing unit 43 are units (processing blocks) attained by the CPU 11 executing the storage control program 18.

Respective items of information on the RAM 12 are information prepared on the RAM 12 by the CPU 11 (storage control program 18) and properly saved (backed up) in the storage device 30 by the CPU 11 in accordance with settings of a user (an administrator of the storage control apparatus 10).

To be specific, upon a setup of the storage control apparatus 10, the user performs an operation of setting an m-value, an N(≥1) value and setting which storage area in the storage device 30 is used as each data storage area. Herein, the data storage areas represent storage areas (a part of the whole storage areas of the storage control apparatus 10) of the storage control apparatus 10, the storage areas being associated with the respective hash logs 23. The data storage area associated with the i-th (i=1 through m) hash log 23 is termed an i-th data storage area.

Note that the post-processing unit 43 sets also a start condition for post-processing by the post-processing unit 43 when performing the operation. The start condition of the post-processing, though an in-depth description of the post-processing will be made later on, is set such as "starting at X:00 every day", "starting at X:00 on every Sunday" and "starting before collecting garbage".

Upon setting the m-value and other equivalent items, the CPU 11 prepares, based on the settings, overlap counter 20, the block map 21, the MBF 22 and the first through m-th hash logs 23 on the RAM 12. On this occasion, the respective items of information prepared by the CPU 11 are the information in a status of not yet containing significant data. The MBF 22 is filter information (data structure) generated by the CPU 11, the structure corresponding to with the m-value (m-bits) being set. There is a limit to the m-value enabling the CPU 11 (storage control program 18) to generate the MBF 22, and hence the m-value is selected from within the m-values enabling the storage control program 18 to generate the MBF 22 upon the setup of the storage control apparatus 10.

Structures of the overlap counter 20, the block map 21, the MBF 22 and the hash logs 23 on the RAM 12 will hereinafter be described together with contents of processes that are executed by the storage processing unit 41, the read processing unit 42 and the post-processing unit 43.

The storage processing unit 41 normally stands by (monitors) till the communication interface of a user terminal 100 receives a write request to the storage device 30.

When receiving the write request for a certain set of information from the user terminal 100, the storage processing unit 41 determines whether the information (which will hereinafter be termed storage target information) has a data size that can be stored in one physical block of the storage device 30. The storage processing unit 41, when the storage target information has the data size that can be stored in one physical block of the storage device 30, executes a storage process in the procedure illustrated in FIG. 4 in the form of dealing with the storage target information itself as storage target data.

Whereas when the storage target information does not have the data size that can be stored in one physical block of the storage device 30, the storage processing unit 41 segments the storage target information into a plurality of segment data each having the size, which can be stored in the physical blocks. Then, the storage processing unit 41 executes the storage process of storage target data, in which each segment data obtained by the segmentation is set as the storage target data.

Figure 4:
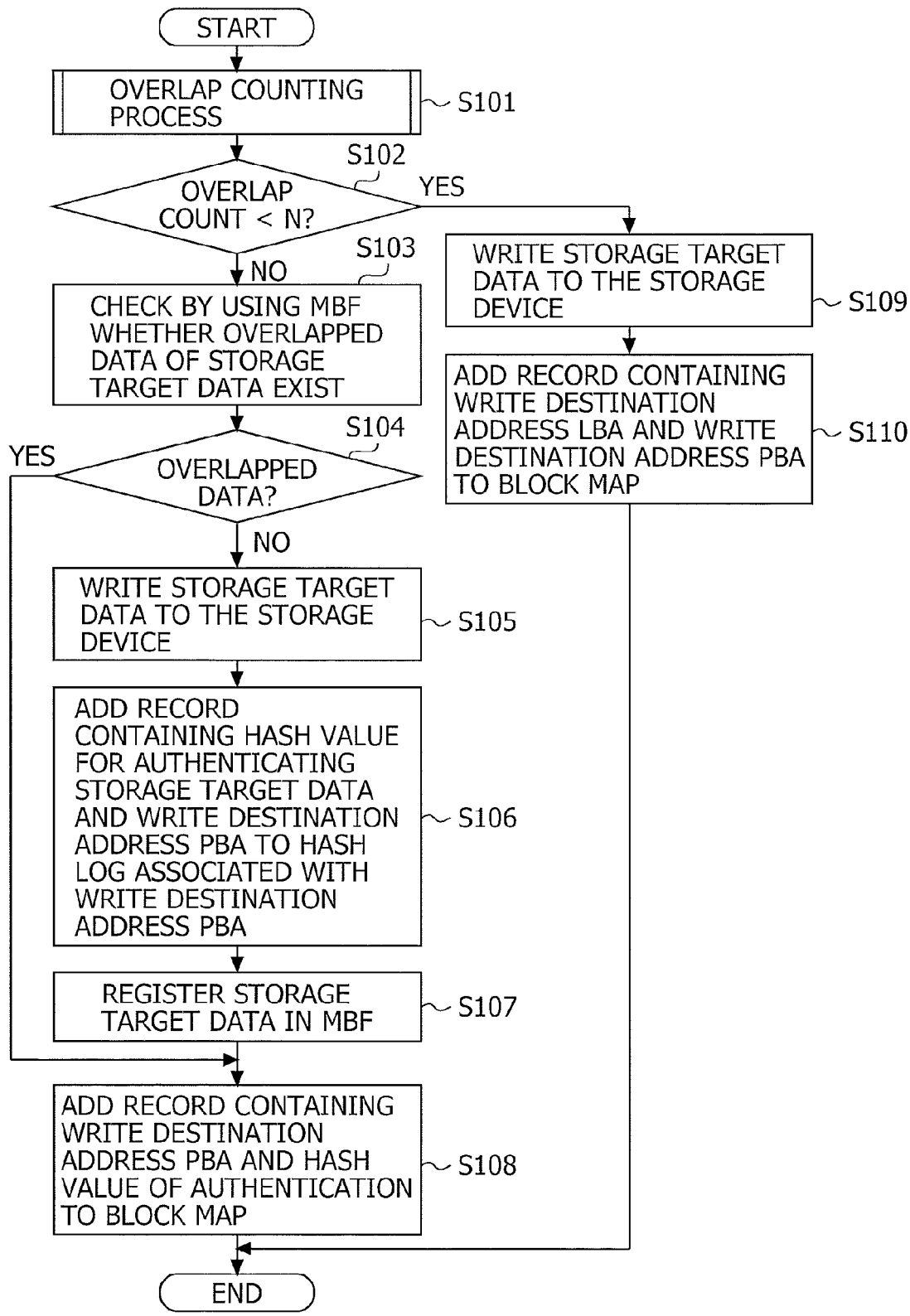
FIG. 4 is a flowchart of a storage process to be executed by the storage control apparatus (storage processing unit)

As depicted in FIG. 4, when executing the process of storing a certain set of storage target data, the storage processing unit 41 executes at first an overlap counting process (step S101).

This overlap counting process is a process of calculating, as "an overlap count of the storage target data", a number of overlapped data of the storage target data that are actually stored in an overlap-eliminated form in the storage device 30 at that point of time (when executing the overlap counting process).

The overlap counting process is a process involving use of the overlap counter 20 on the RAM 12. Therefore, the structure of the overlap counter 20 will be described before explaining contents of the overlap counting process.

Figure 5:
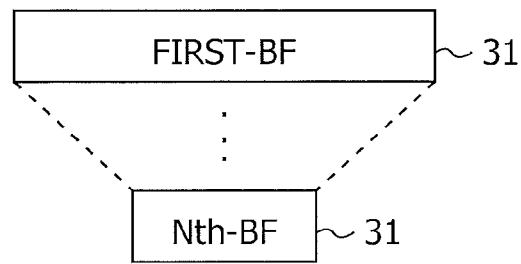
FIG. 5 is an explanatory diagram of an overlap counter.

FIG. 5 schematically illustrates the structure of the overlap counter 20. As schematically illustrated in FIG. 5, the overlap counter 20 includes N-pieces of BF31 from a first Bloom filter (first-BF) 31 up to an Nth Bloom filter (Nth-BF) 31. Note that the overlap counter 20 is prepared based on the N-value set by the user on the RAM 12. Accordingly, when "1" is set as the N-value, the overlap counter 20 becomes a single Bloom filter, and, however, the following discussion will describe the structure of the overlap counter 20 on the assumption of N≥2.

Each of the first-BF through the Nth-BF included in the overlap counter 20 is a normal Bloom filter. Herein, the normal Bloom filter represents the data structure (bit string), in which hash values are mapped to respective bits, and, when registering a certain piece of data, "1" is set in a k-number of bits mapped to a k (≥2) number of hash values calculated from this data.

Bit counts of the respective Bloom filters BF31 of the overlap counter 20, as schematically indicated by dotted lines in FIG. 5, become smaller in the sequence of the first-BF31, the second-BF31 (not illustrated), . . . , the Nth-BF31. A reason why the bit counts of the respective Bloom filters BF31 are thus determined, will be elucidated later on.

Figure 6:
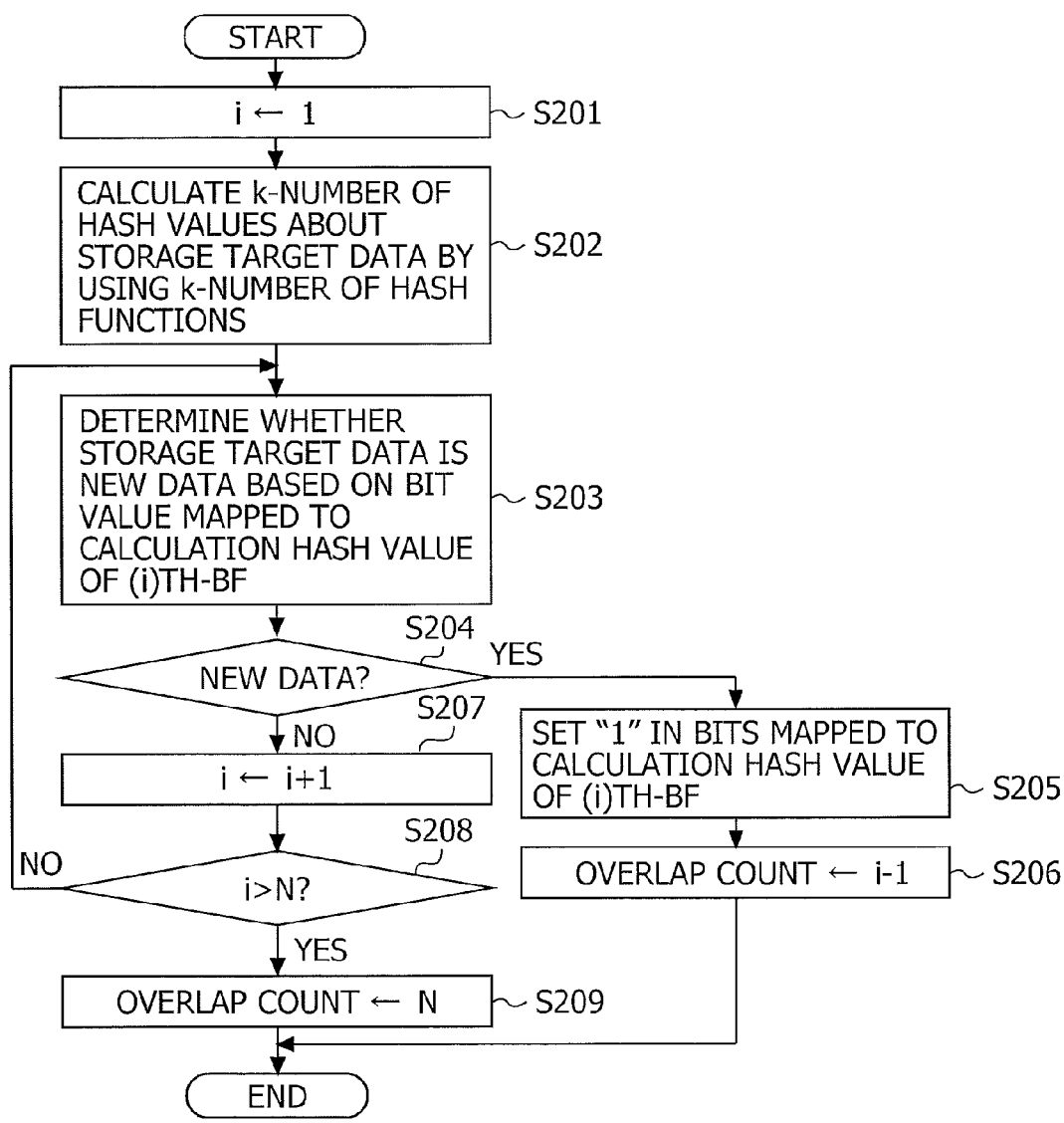
FIG. 6 is a flowchart of an overlap counting process.

The overlap counting process is the process in the procedure illustrated in FIG. 6. Note that the overlap counting process illustrated in FIG. 6 is executed when the N-value takes a value that is "2" or larger, and the overlap counting process not including processes in S207 and S208 is executed when the N-value is "1".

In other words, the storage processing unit 41 starting the overlap counting process sets "1" in a variable "i" (step S201).

Subsequently, the storage processing unit 41 calculates the k-number of hash values about the storage target data by using the k-number of hash functions prepared for the overlap counter 20 (step S202).

The storage processing unit 41 having calculated the k-number of hash values about the storage target data determines whether the storage target data is new data, based on the bit value of the (i)th-BF31, the bit value being mapped to each hash value (which will hereinafter be also termed a calculation hash value) (step S203).

Specifically, in step S203, the storage processing unit 41 reads at first the bit value mapped to the calculation hash value from the (i)th-BF31. Then, the storage processing unit 41, when the bit value mapped to a certain calculation hash value is "0", determines that the storage target data is the new data, and finishes the process in step S203. Whereas when the k-number of bit values mapped to the k-number of calculation hash values are all "1", determines that the storage target data is not the new data, and finishes the process in step S203.

Note that the determination made in step S203 is precisely a determination as to whether the storage target data is the (i)th overlapped data. In other words, the new data represents the (i)th overlapped data in the description of the overlap counting process (FIG. 5).

The storage processing unit 41, when determining that the storage target data is the new data (step S204; YES), sets "1" in the respective bits mapped to the calculation hash values of the (i)th-BF (step S205). The storage processing unit 41, after storing "i−1" as the overlap count of the storage target data (step S206), terminates this overlap counting process.

Whereas when determining that the storage target data is not the new data (step S204; NO), the storage processing unit 41 adds "1" to the variable "i" (step S207). Then, the storage processing unit 41 determines whether a relation "i>N" is established (step S208). When "i>N" is not established (step S208; NO), the storage processing unit 41 re-executes the processes from step S203 onward.

The storage processing unit 41, when "i>N" becomes established during the repetition of these processes (step S208; YES), finishes the overlap counting process after storing "N" as the overlap count of the storage target data (step S209).

As apparent from the processing procedure of the overlap counting process described above, when an (i−1) number of data having the same contents as those of the storage target data are stored in the storage device 30, the storage target data is registered in the (i)th-BF 31 (i=1 through N) of the overlap counter 20. In other words, the (i)th overlapped data is registered in the (i)th-BF 31 of the overlap counter 20. Accordingly, the data count of the data registered in a (J+1)th-BF31 (j=1 through N−1) is smaller than a data count of the data registered in the (j)th-BF31. The BF is the data structure enabling the bit count to be reduced when the data having a small data count are registered, and it is better to set a smaller storage capacity, used for storing/retaining, of the overlap counter 20. Therefore, as described above, the bit counts of the respective Bloom filters BF31 of the overlap counter 20 are set smaller in the sequence of the first-BF31, the second-BF31, . . . , the Nth-BF31.

Referring back to FIG. 4, the description of the storage process continues. The storage processing unit 41 having finished the overlap counting process (step S101) determines whether the overlap count of the storage target data, which is obtained in the overlap counting process, is smaller than "N" or not (step S102).

When the overlap count is smaller than "N" (step S102; YES), the storage processing unit 41 writes the storage target data to the storage device 30 (step S110).

More specifically, the storage processing unit 41 at first determines the PBA of the physical block of the storage device 30, the PBA serving as an actual write destination address of the storage target data. The PBA is determined taking account of a write destination address LBA (Logical Block Address) of the storage target data so that the data having the LBAs close to each other are written to the same data storage area. Note that the write destination address LBA of the storage target data represents an LBA contained in the received write request, or an LBA that is calculated from the former LBA and a location of the storage target data in the storage target information (subjected to a write instruction by the write request).

Subsequently, the storage processing unit 41 writes the storage target data to the physical block allocated with the determined PBA (which will hereinafter be referred to as a write destination address PBA). Then, the storage processing unit 41 finishes the process in S110.

The storage processing unit 41 having finished the process in step S110 adds a record containing the write destination address LBA and the write destination address PBA to the block map 21 (Step S111).

Figure 7:
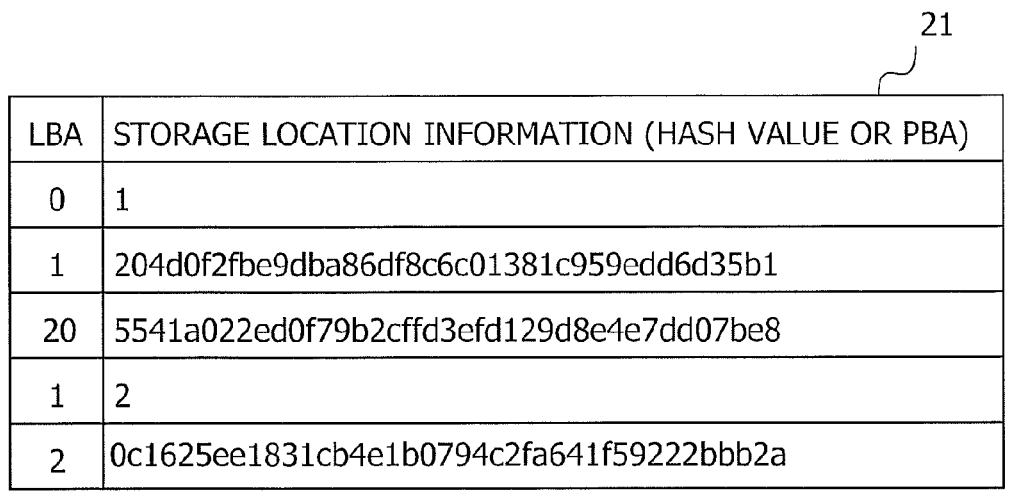
FIG. 7 is an explanatory diagram of a block map.

The block map 21 has, as illustrated in FIG. 7, an "LBA" field and a "storage location information" field. The "storage location information" field of the block map 21 is a field in which the PBA or the hash value is registered as the storage location information. When executing the process in step S111, the storage processing unit 41 adds, to the block map 21, a record containing the write destination address and the write destination address PBA that are set in the "LBA" field and the "storage location information" field, respectively.

The storage processing unit 41 having finished the process in step S111 terminates this storage process (FIG. 4).

While on the other hand, when the overlap count of the storage target data is not smaller than "N" (step S102; NO), the storage processing unit 41 checks whether there is overlapped data of update target data by using the MBF 22 (step S103).

An in-depth description of the process in step S103 will be made later on together with of a structure of the MBF 22, and, however, the process in step S103 is a process of checking whether data having the same contents as those of the update target data is registered in the MBF 22. As already described (refer to step S102, S110, S111), the data with the overlap count being smaller than "N" is not registered in the MBF 22. Hence, even when the data having the same contents as those of the update target data is already stored in the storage device 30, the storage processing unit 41 determines that any overlapped data of the update target data does not exist when executing the process in step S103 as the case may be.

When any overlapped data of the update target data does not exist (step S104; NO), the storage processing unit 41 writes the storage target data to the storage device 30 (step S105). The process in step S105 is the same as the process in step S110 described above. To be specific, in step S105, the storage processing unit 41 executes a process of determining the write destination address PBA and writing the storage target data to this write destination address PBA.

Subsequently, the storage processing unit 41 adds a record containing a hash value for authenticating the storage target data and the write destination address PBA, which are set in the respective fields, to the hash log 23 associated with the write destination address PBA (step S106).

Figure 8:
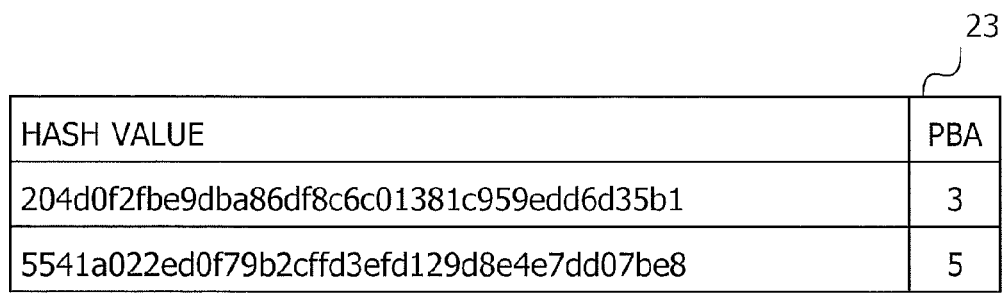
FIG. 8 is an explanatory diagram of hash logs.

The hash log 23 is defined as a table having a "hash value" field and a "PBA" field as illustrated in FIG. 8.

As already described, the (i)th (i=1 through m) hash log 23 on the RAM 12 is associated with the (i)th data storage area. The foregoing "hash log 23 associated with the write destination address PBA" indicates the hash log 23 associated with the data storage area containing the logical block to which the write destination address PBA is allocated.

The hash value for authentication represents a hash value usable for determining whether two data are identical with each other. The hash value for authentication involves using a secure hash value calculated normally by algorithms instanced by MD5 (Message-Digest 5), SHA (Secure Hash Algorithm)-1, SHA-256 and other equivalent algorithms.

The storage processing unit 41 having finished the process in step S106 (FIG. 4) registers the storage target data in the MBF 22 (step S107). An in-depth description of the process in step S107 will be made later on, and, however, the data (elements to be added to the MBF 22) to be actually registered in the MBF 22 is not the storage target data itself but the hash value for authenticating the storage target data.

The storage processing unit 41 having the finished the process in step S107 adds, to the block map 21 (FIG. 7), a record containing the write destination address LBA and the hash value for authenticating the storage target data, which are registered in the "LBA" field and the "storage location information" field (step S108). Then, the storage processing unit 41 terminates this storage process.

The structure of the MBF 22 and the processes in step S102, S107 will hereinafter be described in detail.

Figure 9:
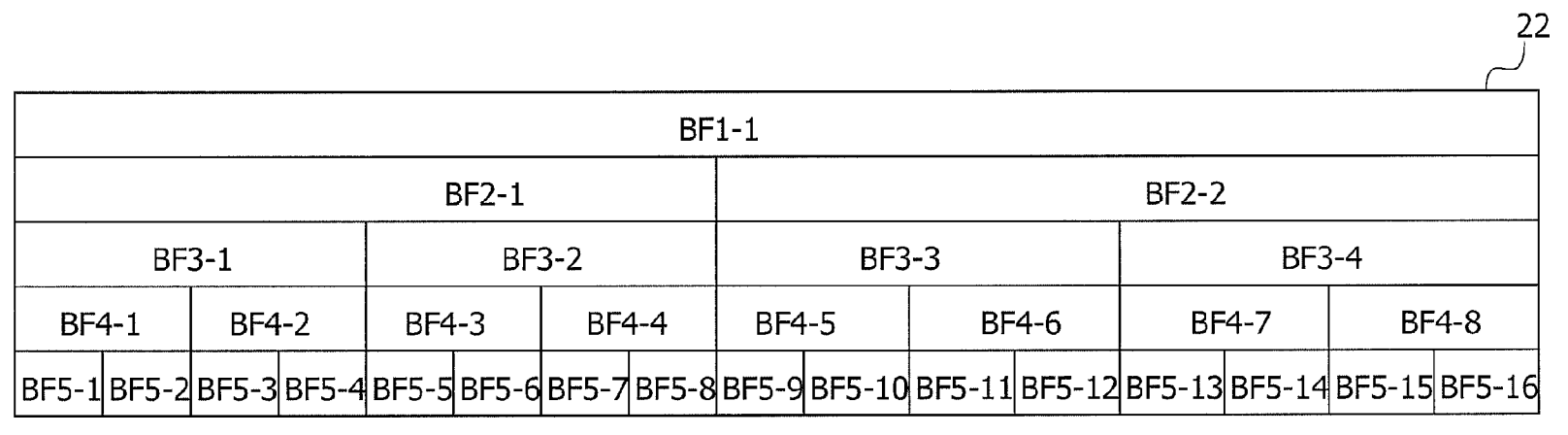

FIG. 9 depicts an example of the structure of the MBF 22. The MBF 22 illustrated in FIG. 9 can be used when m=16. It is therefore assumed in the following discussion that the storage area of the storage device 30 is segmented into first through sixteenth data storage areas, and first through sixteenth hash logs 23 exist on the RAM 12.

The respective Bloom filters BF included in the MBF 22 depicted in FIG. 9 are the normal Bloom filters. However, BF5-1 through BF5-16 at the lowest layer of the MBF 22 are individually associated with the first through sixteenth data storage areas of the storage device 30.

The Bloom filters BF at the first through fourth layers of the MBF 22 are associated with the data storage areas with which respective Bloom filters BF at the lowest layer positioned under the individual Bloom filters BF are associated in FIG. 9. To be specific, the Bloom filter BF4-1 is associated with the first and second data storage areas with which BF5-1, BF5-2 are respectively associated. The Bloom filter BF4-2 is associated with the third and fourth data storage areas with which BF5-3, BF5-4 are respectively associated. The Bloom filter BF3-1 is associated with the first through fourth data storage areas with which BF5-1 through BF5-4 are respectively associated. Other Bloom filters BF at the first through fourth layers are likewise associated with the data storage areas with which the Bloom filters BF at the lowest layer position under the respective Bloom filters BF are associated.

On the occasion of registering a certain set of storage target data in the MBF 22, the storage target data are registered in the respective Bloom filters BF associated with the data storage areas including the logical block to which the storage target data are written. Note that the data to be actually registered in the MBF 22 (the BF of the MBF 22) is, as already described, not the storage target data itself but the hash value for authenticating the storage target data. As a matter of convenience in description, however, with respect to the processing for the MBF 22, the hash value of authenticating the storage target data is, in principle, referred to as the storage target data.

To be specific, the storage target data is already written to the first storage area in step S105, in which case the storage target data are registered in the Bloom filters BF5-1, BF4-1, BF3-1, BF2-1 and BF1-1 in step S107. When the storage target data is already written to the eleventh storage area in step S105, in which case the storage target data are registered in the Bloom filters BF5-11, BF4-6, BF3-3, BF2-2 and BF1-1 in step S107.

The process in, e.g., the following procedure is executed in step S103. Note that the Bloom filters BF subordinate to a certain Bloom filter BF represent the Bloom filters BF illustrated just under a certain Bloom filter BF in FIG. 9 in the following discussion. Specifically, e.g., the Bloom filters BF subordinate to, e.g., BF1-1 are BF2-1 and BF2-2, and the Bloom filters BF subordinate to BF2-2 are BF3-3 and BF3-4.

The following is the procedure including:
checking whether the storage target data is registered in BF1-1;
finishing the process after storing, when the storage target data is not registered in BF1-1, information that the storage target data does not exist;
sequentially checking, whereas when the storage target data is registered in BF1-1, whether the storage target data are registered in the Bloom filters BF subordinated to BF1-1;
finishing the process after storing, when unable to search out the subordinate Bloom filters BF registering the storage target data, information that any storage target data does not exist;
sequentially checking, whereas when able to search out the subordinate Bloom filters BF registering the storage target data, whether the storage target data are registered in the Bloom filters BF subordinate to these subordinate Bloom filters BF;
finishing the process after storing, when unable to search out the subordinate Bloom filters BF registering the storage target data, information that any storage target data does not exist;
checking, when the lowest layer BF registering the storage target data can be specified by iterating the same processes, whether the hash value for authenticating the storage target data is stored in the hash log 23 associated with this BF; and
finishing the process after storing, when the hash value for authenticating the storage target data is stored in the hash log 23, information that the overlapped data of the storage target data exists.

Note that when determining whether the data exists in BF, as well know, the data not actually existing is possibly determined to exist as the case may be. Therefore, when the subordinate BF registering the storage target data is not searched out, such a setting is preferable that unchecked Bloom filters BF positioned higher by one layer are rechecked.

Next, processes of the read processing unit 42 (FIG. 3) will be described.

Figure 10:
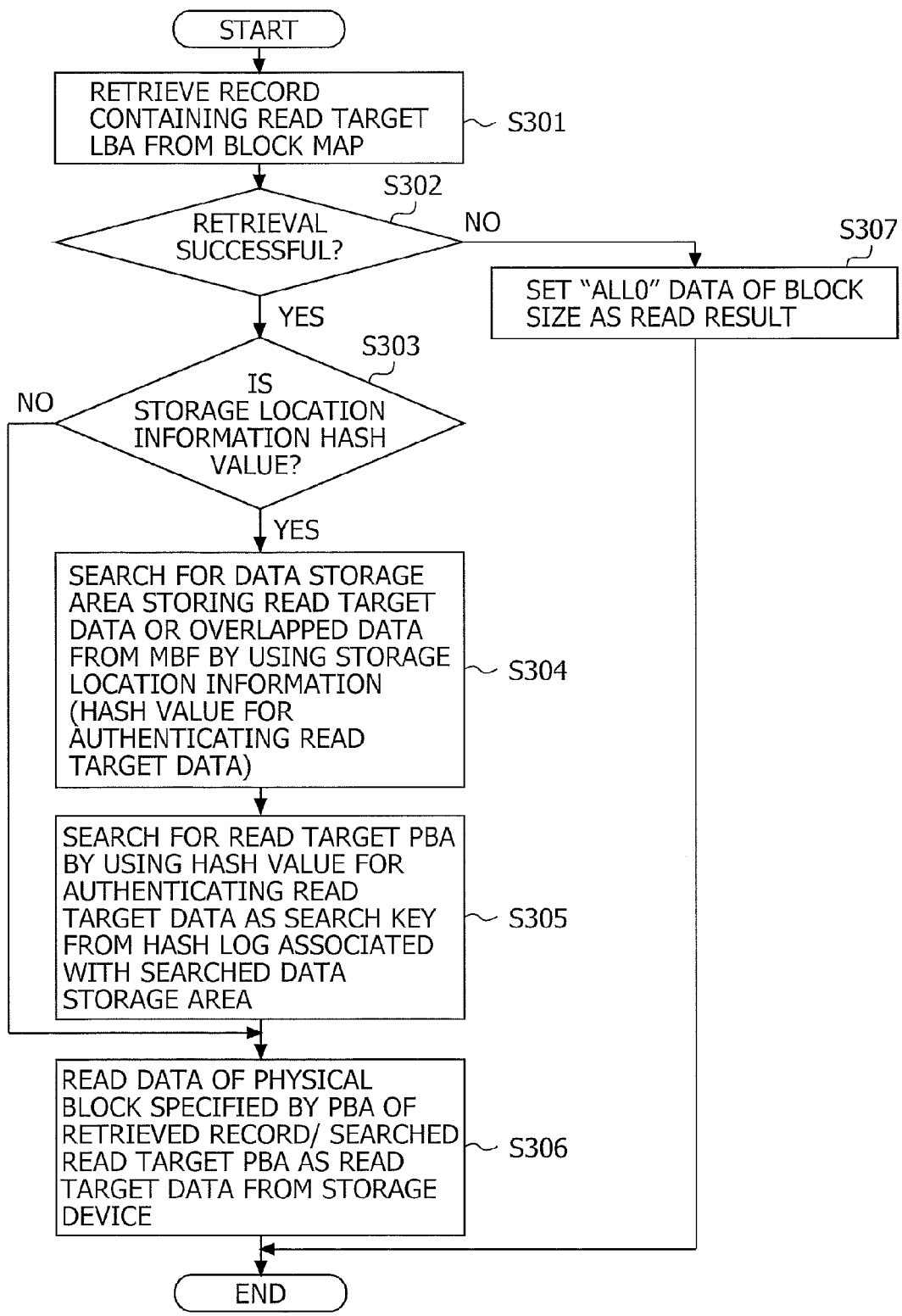
FIG. 10 is a flowchart of a read process to be executed by the storage control apparatus (read processing unit)

The read processing unit 42 is a unit (processing block) to read the data from the storage device 30. FIG. 10 illustrates a flowchart of a read process to be executed when the read processing unit 42 reads a certain set of data from the storage device 30. Note that read target data represents the data to be read from the storage device 30, and a read target LBA represents the LBA of the read target data in a description of this flowchart and in the following discussion. The storage processing unit 41, when the user terminal 100 transmits a read request for reading from the storage device 30, prepares requested data by executing a read process several times, and transmits the prepared data back to the user terminal 100.

As illustrated in FIG. 10, the read processing unit 42 having started this read process, at first, searches for a record containing the read target LBA being set in the relevant field from the block map 21 (step S301).

Then, the read processing unit 42, when unable to search for the record containing the read target LBA being set in the relevant field (step S302; NO), finishes the read process after setting "ALLO" data having a block size as a result of reading the data of the read target LBA (step S307).

Whereas when able to search for the record containing the read target LBA being set in the relevant field (step S302; YES), the read processing unit 42 determines whether storage location information (a value of the "storage location information" field) contained in the searched record is the hash value (step S303).

When the storage location information contained in the searched record is not the hash value, the storage location information is the PBA of the physical block storing the read target data (step S111 in FIG. 4, and see FIG. 7).

Therefore, in this case (step S303; NO), the read processing unit 42 executes the process of reading the data of the physical block specified by the PBA read from the block map 21 as the read target data from the storage device 30 (step S306).

Whereas when the storage location information contained in the searched record is the hash value, the storage location information is the hash value for authenticating the storage target data (refer to step S108 in FIG. 4). The PBA of the physical block storing the read target data or the data having the same contents as those of the read target data (this PBA will hereinafter be termed a read target PBA) is stored in the hash log 23 (FIG. 8) associated with the hash value for authenticating the storage target data.

As described above, the MBF 22 is structured to enable the search for the data storage area storing a certain set of data.

Therefore, when the storage location information contained in the searched record is the hash value (step S303; YES), the read processing unit 42 executes the processes in step S304-S306.

To be specific, when the storage location information is the hash value, the read processing unit 42, to begin with, searches for the data storage area storing the read target data or other equivalent data from the MBF 22 by using the storage location information (the hash value for authenticating the storage target data) (step S304). Note that the read target data or other equivalent data represents the read target data itself or the data having the same contents as those of the read target data.

Subsequently, the read processing unit 42 searches for the read target PBA by using the hash value for authenticating the storage target data as a search key from the hash log 23 associated with the searched data storage area (step S305). Thereafter, the read processing unit 42 reads the data of the physical block specified by the searched read target PBA as the read target data from the storage device 30 (step S306). Subsequently, the read processing unit 42 finishes this read process.

The post-processing unit 43 will hereinafter be described. The following are an elucidation of a reason why the overlapped data up to the (N−1)th data are not registered in the MBF 22 and a description of a purpose of the post-processing executed by the post-processing unit 43.

As already described, the storage control apparatus 10 is the apparatus developed on the assumption of being used in the environment where the multiple items of information instanced by "the L-pieces of information (FIG. 2) being coincident in content of the rate P field with each other but different in content of the rate 1−P field from each other", are stored in the storage device 30.

Figure 2:
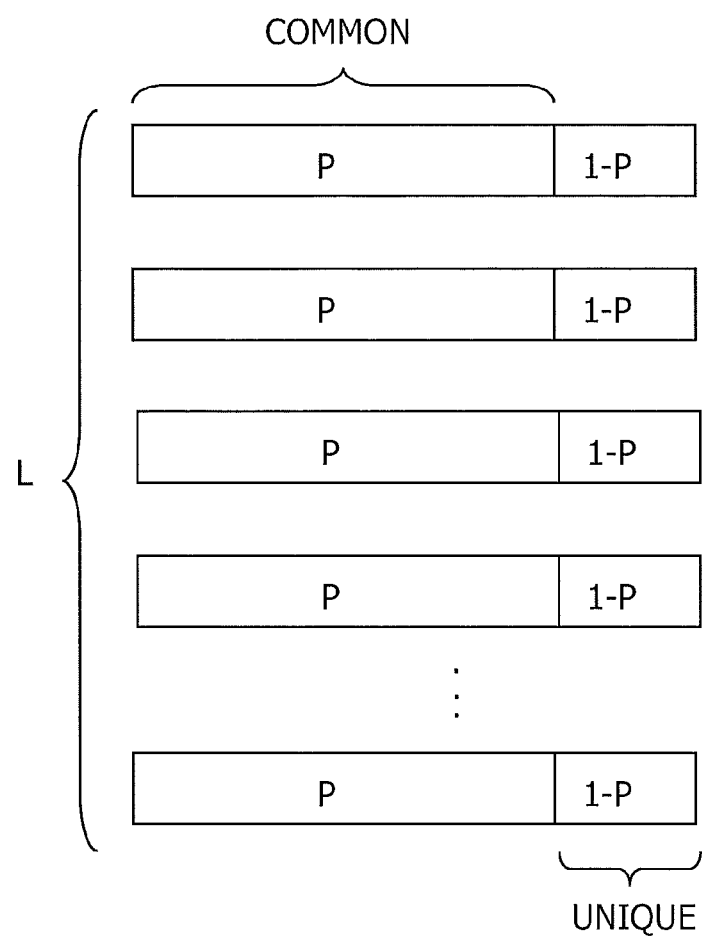
FIG. 2 is an explanatory diagram of information assumed to be stored in a storage device by the storage control apparatus.

Considered are a case that the L-pieces of information illustrated in FIG. 2 are stored in the storage device 30 by a storage control apparatus (which will hereinafter be referred to as a conventional apparatus) to register the data from the first data in the MBF, and a case that the L-pieces of information are stored in the storage device 30 by the storage control apparatus 10.

Figure 11A:
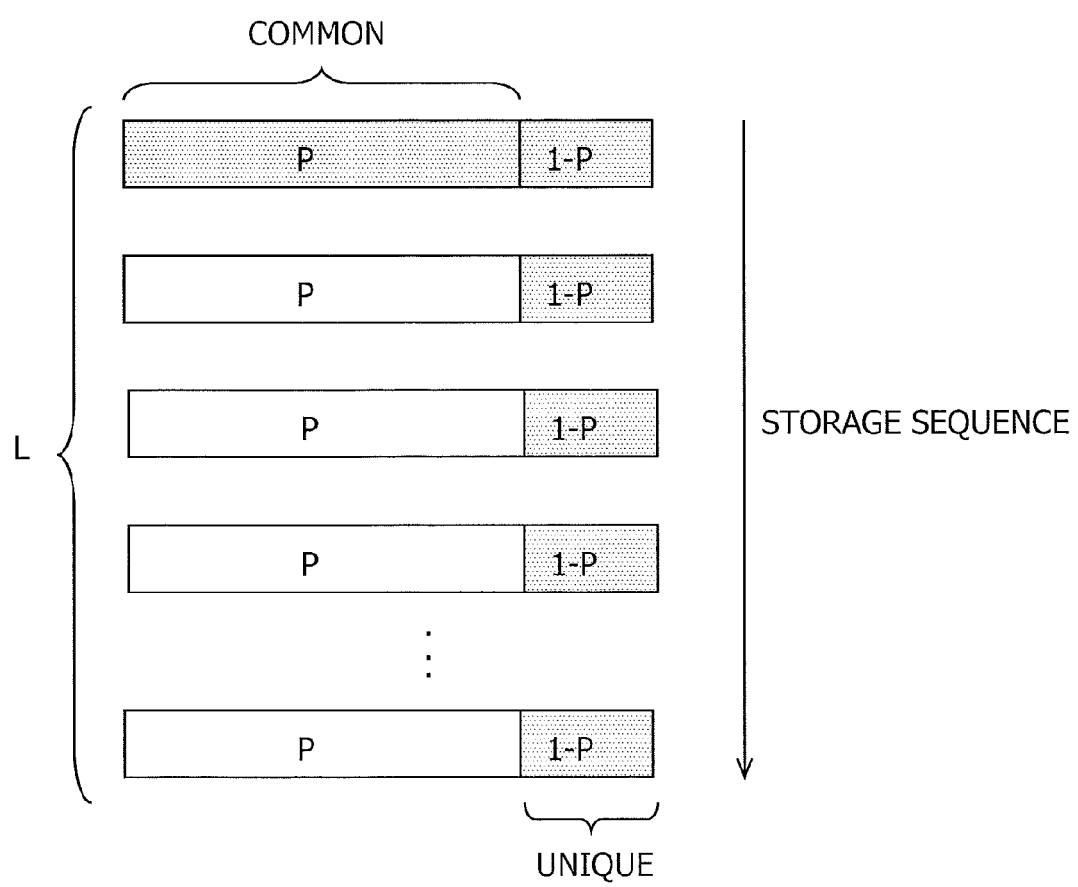
FIG. 11A is an explanatory diagram of a mode of storing and managing information by a conventional apparatus.

When the conventional apparatus stores the L-pieces of information in the storage device 30, new data are all registered in the MBF. Accordingly, it follows that the MBF registers all the data in the information indicated first to be stored in the storage device 30, and the data in the rate P field in the respective items of information indicated second through L-th to be stored in the storage device 30. However, the data in the rate P field in the respective items of information indicated second through L-th to be stored in the storage device 30 are not written to the storage device 30, and eventually it follows that a mode of storing and managing the L-pieces of information by the conventional apparatus is expressed as in FIG. 11A. Note that the data in the fields indicated by hatching in FIG. 11A are the data registered in the MBF and actually written to the storage device 30. The data not indicated by hatching are the data not written to the storage device 30.

While on the other hand, when the storage control apparatus 10 stores the same L-pieces of information in the storage device 30, the overlapped data up to the (N−1)th data are written to the storage device 30 without being registered in the MBF 22. Accordingly, e.g., when N=3, it follows that the mode of storing and managing the L-pieces of information by the storage control apparatus 10 is expressed as in FIG. 11B. Note that the data in the fields indicated by dense hatching are the overlapped data up to the (N−1)th data and are therefore the data being written to the storage device 30 without being registered in the MBF 22 in FIG. 11B. The data in the field indicated by sparse hatching is the data registered in the MBF and actually written to the storage device 30, similarly to the data in the fields indicated by hatching in FIG. 11A. Further, the data in the fields with no hatching are the data not written to the storage device 30, similarly to the data in the fields not indicated by hatching in FIG. 11A.

Figure 11B:
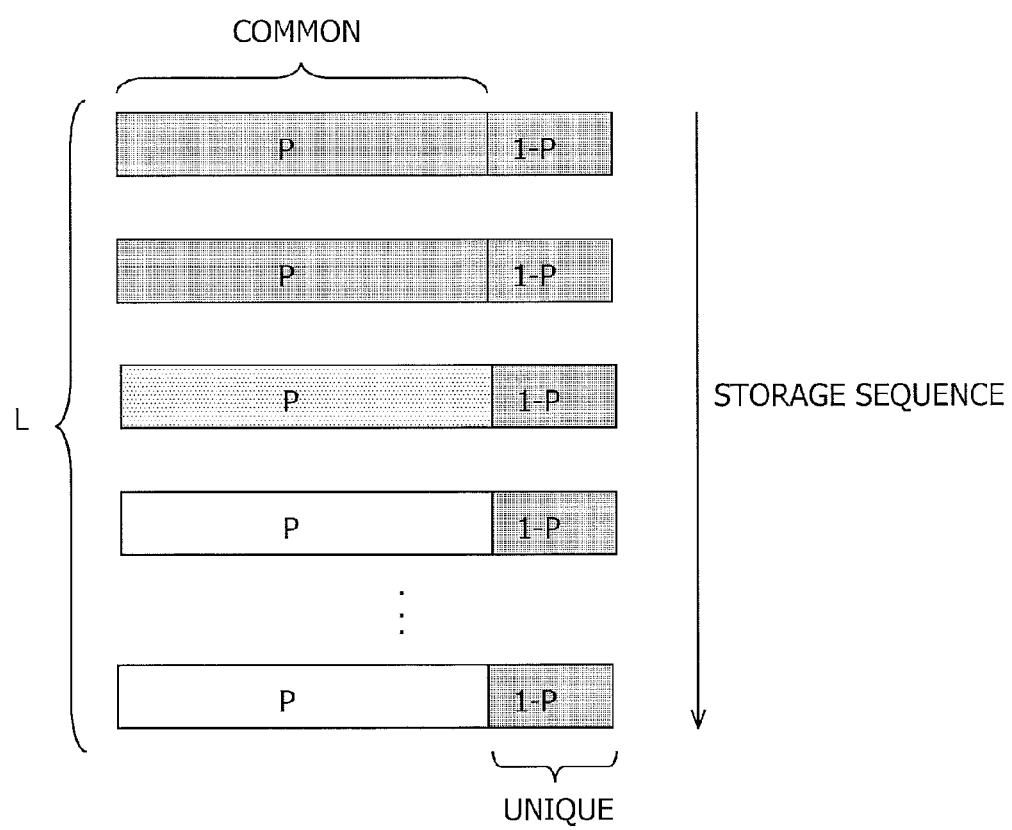
FIG. 11B is an explanatory diagram of a mode of storing and managing the information by the storage control apparatus.

As apparent from a comparison between FIG. 11A and FIG. 11B, a data size of the management target data of the MBF (a total data size in the fields indicated by sparse hatching) can be reduced by writing the overlapped data up to the (N−1)th data to the storage device 30 without being registered in the MBF 22. With the MBF management target data size being small, a size of the MBF can be also decreased. The storage control apparatus 10 is therefore configured (or programmed softwarewise) as the apparatus to write the overlapped data up to the (N−1)th data to the storage device 30 without being registered in the MBF 22.

However, as apparent from FIGS. 11A and 11B, a reduction quantity of the information storage capacity (the total data size with omission of the write to the storage device 30, and the total data size in the fields with no hatching) by the storage control apparatus 10 becomes smaller than by the conventional apparatus.

The post-processing is a process for equalizing the reduction quantity of the information storage capacity by the storage control apparatus 10 to the quantity by the conventional apparatus.

Contents of the post-processing will hereinafter be concretely described.

Figure 12:
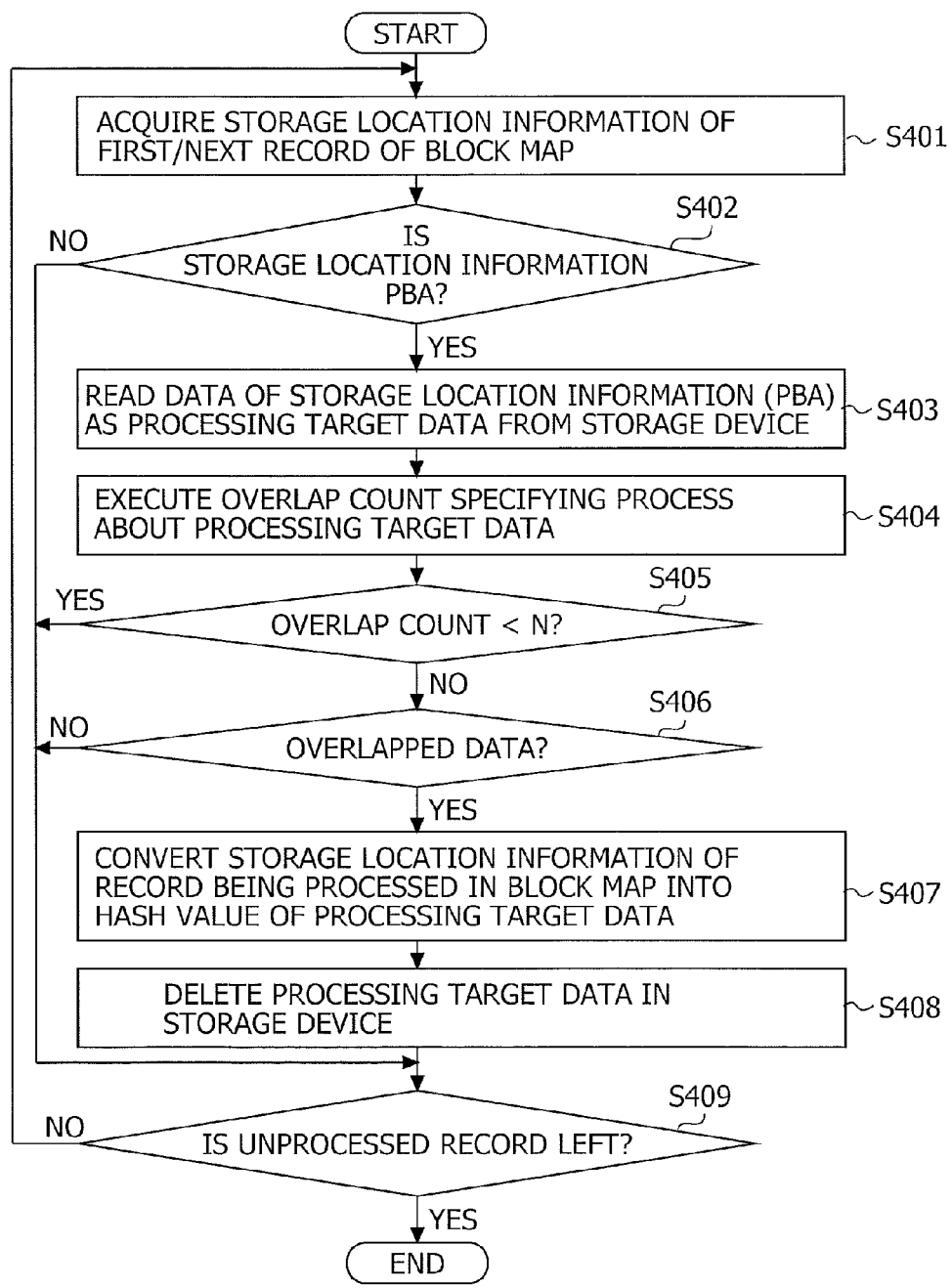
FIG. 12 is a flowchart of post-processing to be executed by the storage control apparatus (post-processing unit)

FIG. 12 illustrates a flowchart of the post-processing. Note that the post-processing unit 43, as already explained, starts this post-processing upon satisfying the start condition (instanced by "starting at X:00 every day" and other equivalent conditions) being set.

As illustrated in FIG. 12, the post-processing unit 43 having started the post-processing, at first, acquires the storage location information contained in the first record of the block map 21 (step S401). Subsequently, the post-processing unit 43 determines whether the acquired storage location information is the PBA or not (step S402).

When the storage location information is not the PBA (step S402; NO), the post-processing unit 43 determines whether all of the records of the block map 21 are processed or not (step S409). When some records remain unprocessed (step S409; NO), the post-processing unit 43 loops the processing back to step S401 to acquire the storage location information of the next record of the block map 21.

Whereas when the storage location information is the PBA (step S402; YES), the post-processing unit 43 reads the data of the storage location information (PBA) as the processing target data from the storage device 30 (step S403). Then, the post-processing unit 43 executes an overlap count specifying process about the processing target data (step S404).

The overlap count specifying process executed in step S404 has the same contents as those of the overlap counting process except a point of not executing the process in step S205. A detailed description of the overlap count specifying process is therefore omitted.

The post-processing unit 43 having finished the overlap counting process determines whether or not the overlap count, obtained by the overlap counting process, of the processing target data is smaller than "N" (step S405). When the overlap count is not smaller than "N" (step S405; NO), the post-processing unit 43 determines whether or not the overlapped data (managed by the MBF 22) of the processing target data is actually stored in the storage device 30 (step S406). The process executed in this step is the same as the process in step S103 (FIG. 4) described above.

When the overlapped data of the processing target data is actually stored in the storage device 30 (step S406; YES), the post-processing unit 43 converts the storage location information of the record, being currently processed, of the block map 21 into the hash value for authenticating the storage target data (step S407). Then, the post-processing unit 43 executes, after deleting the storage target data in the storage device 30 (step S408), the process (determination) in step S409.

Whereas when the overlap count is smaller than "N" (step S405; YES), the post-processing unit 43 executes the process (determination) in step S409 without performing the processes in step S407 and S408. Further, also when the overlapped data of the processing target data is not stored in the storage device 30 (step S406; NO), the post-processing unit 43 executes the process in step S409 without conducting the step S407 and S408.

When completing the processing of all the records of the block map 21 (step S409; YES), the post-processing unit 43 finishes the post-processing.

The contents of this post-processing will hereinafter be described further concretely.

The mode of storing and managing the information into the storage device 30 by the storage control apparatus 10 is as illustrated in FIG. 11B, in which state such a case is considered that the post-processing is executed. Note that an N-value of the storage control apparatus 10 is assumed to be "3".

Figure 13:
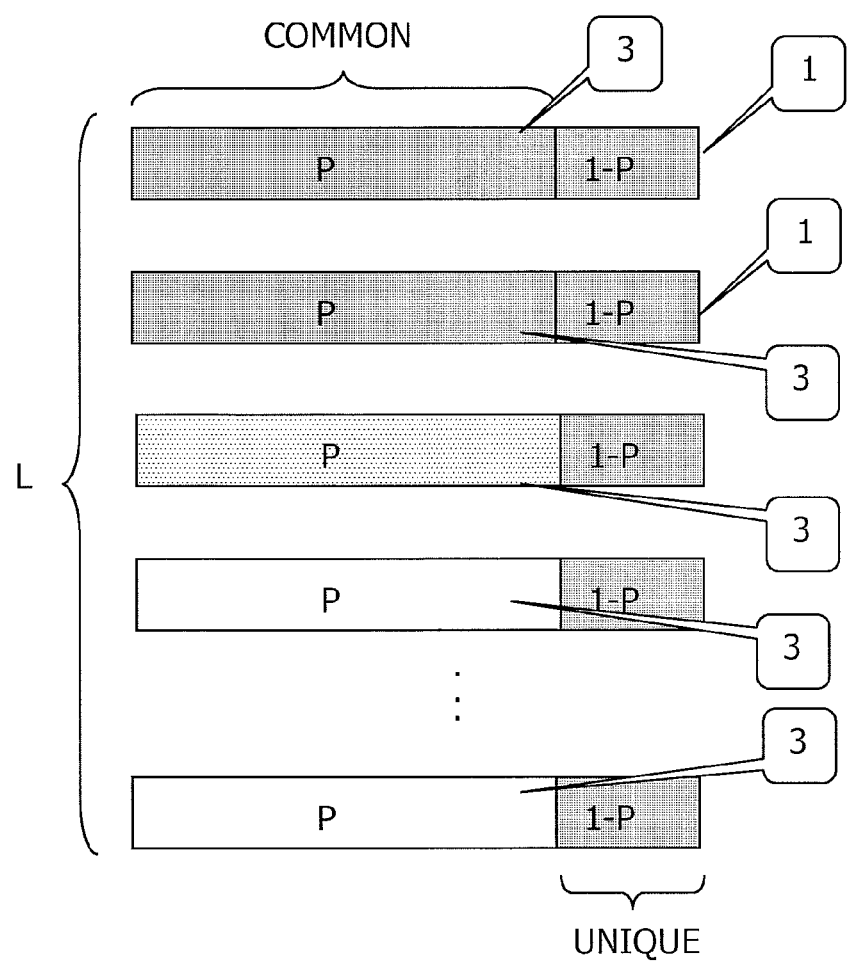
FIG. 13 is an explanatory diagram of the mode of storing and managing the information by the storage control apparatus, and an overlap count of data of each unit when performing the post-processing.

In this case, as schematically illustrated in FIG. 13, each of the overlap counts of the sets of data configuring the common fields (the rate P fields) of the information is "3". Further, each of the overlap counts of the sets of data configuring the unique fields (the rate 1−P fields) of the information is "1".

The data of the fields indicated by dense hatching are the overlapped data up to the (N−1)th data and are therefore the data written to the storage device 30 without being registered in the MBF 22. In other words, the storage location information of each set of data of the field indicated by the dense hatching is the PBA.

Accordingly, the processing of the data configuring the common fields (the rate P fields) diverts to a "YES" side from step S402 and diverts to a "NO" side from step S405, and consequently it follows that none of the processes in step S407, S408 are carried out.

The data of the common fields indicated by dense hatching is the N-th overlapped data, and is therefore the data written to the storage device 30 after the record containing the hash value for authentication as the storage location information has been added to the block map 21 (see FIG. 4). Hence, the processing of the data configuring the common fields diverts to the "NO" side from step S402, and consequently it follows that none of the processes in step S407, S408 are carried out.

The data of the common fields not indicated by hatching are also the data of the record added to the block map 21, the record containing the hash value for authentication as the storage location information when stored. Accordingly, with respect to the data of the common fields not indicated by hatching, none of the processes in step S407, S408 are executed.

Executed in step S407 and S408 are the process of converting the storage location information of the record of the data determined to be the processing target data in step S406 and other equivalent steps into the hash value for authenticating the processing target data, and the process of deleting this processing target data from the storage device 30.

Figure 14:
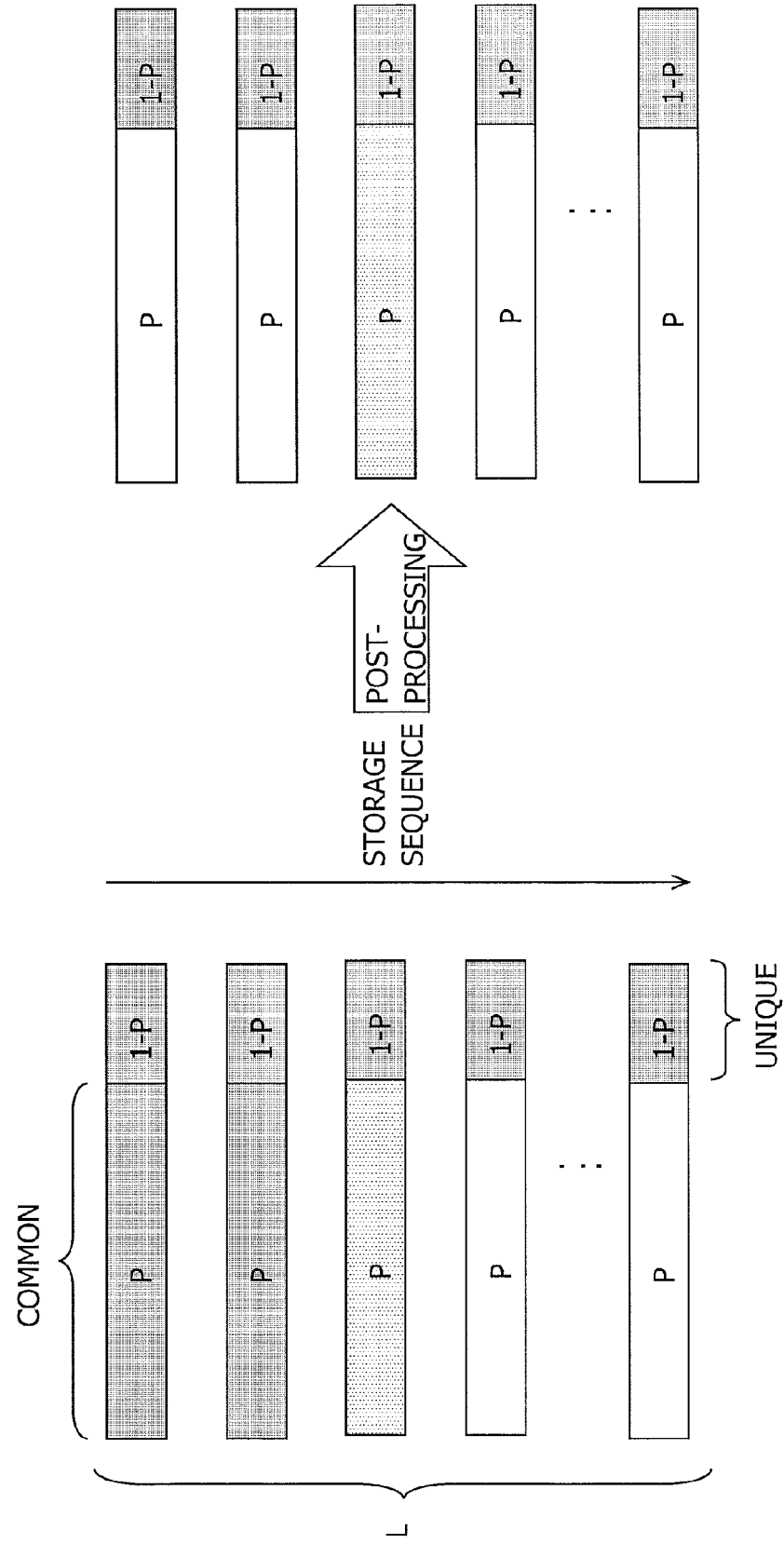
FIG. 14 is an explanatory diagram of contents of the post-processing.

Therefore, when the post-processing is executed in the state with the information storage management mode being as illustrated in FIG. 13 (FIG. 11B), as depicted in FIG. 14, the N-number ("3" in FIG. 14) of overlapped data, i.e., the first through (N−1)th overlapped data in the written overlapped data can be deleted from the storage device 30 in the form of not disabling these overlapped data from being read.

The reduction quantity of the information storage capacity when storing and managing the L-pieces of information in the mode illustrated on the right side in FIG. 14 is equal to a reduction quantity when storing and managing the same L-pieces of information by the conventional apparatus in the mode illustrated in FIG. 11A. Further, as already described, the size of the MBF 22, i.e., the management data size, can be made small (reduced) by writing the overlapped data up to the (N−1)th data to the storage device 30 without being registered in the MBF 22.

Therefore, as illustrated in FIG. 15, the reduction quantity ("reduction quantity/management data size") of the information storage capacity per unit management data size in the overlap elimination having the contents described above (extended overlap elimination in FIG. 15), becomes larger than the normal overlap elimination by the conventional apparatus. Accordingly, the storage control apparatus 10 can be said to be an apparatus configured to have the larger reduction quantity of the information storage capacity than by the conventional apparatus having the same management data size, and also to be an apparatus configured have the same reduction quantity of the information storage capacity as that of the conventional apparatus but have the smaller management data size than the conventional apparatus.

<<Modified Mode>>

The storage control apparatus 10 described above may be modified in a variety of forms. For example, the storage control apparatus 10 can be modified into an apparatus using a normal Bloom filter BF in place of the MBF 22, and using a table for managing the associative relation between the LBA, the PBA and the hash value for authentication in place of the block map 21 and the m-number of hash logs 23. However, with this modification being carried out, when determining whether there exist the overlapped data of the storage target data, it follows that the same hash value for authentication as the hash value for authenticating the storage target data is retrieved from the table equivalent to the m-number of hash logs 23. Then, adoption of the foregoing configuration (using the MBF 22, the block map 21 and the m-number of hash logs 23) enables desired items of information to be acquired by the retrieval from a much smaller quantity of data (single hash log 23). It is therefore desirable that the storage control apparatus 10 adopts the foregoing configuration.

It may be sufficient that the data to be deleted by the post-processing are the data with the same contents still remaining in the storage device 30 even when deleted from the storage device 30. The post-processing may be therefore configured as a process of leaving the information of the first common fields but deleting the information of the second and third common fields in FIG. 13. However, with the post-processing being configured as such a process, the processing contents are complicated. It is therefore preferable that the post-processing remains to be a process of leaving the data managed by the MBF 22 as described above.

Further, the post-processing may also be modified into a process of setting a part of records of the block map 21 as processing target records, and the post-processing unit 43 may be modified into a unit configured to properly execute the post-processing while varying the processing target record.

Moreover, a process equivalent to the post-processing (which will hereinafter be referred to as per-storage post-processing) may also be executed whenever executing step S105 through step S108 of the storage process (FIG. 4). Herein, the per-storage post-processing represents a process of searching for the overlapped data of the storage target data written by the process in step S105, then deleting the overlapped data from the storage device 30, and updating the contents of the block map 21 to read the storage target data when reading the deleted data. However, the overlapped data of the storage target data is not easily searched for in the block map 21. Therefore, the per-storage post-processing is executed whenever conducting step S105-S108 of the storage process, in which case it is desirable to configure the block map 21 so that the hash value for authentication is registered in each record.

This type of block map 21 may be exemplified by a block map having an "LBA" field, a "hash value for authentication" field and a "PBA" field that registers the addresses PBA when dealing with the storage target data up to the (N−1)th data. The "PBA" field may be replaced by a "flag" field for registering a flag indicating whether the data is any one of the storage target data up to the (N−1)th data. Note that the block map 21 having the "LBA" field, the "hash value for authentication" field and a "PBA/flag" field may be adopted also when configured not to execute the per-storage post-processing each time step S105-S108 of the storage process are conducted.

The flag indicating whether the data is any one of the storage target data up to the (N−1)th data may also be added to a head field or another equivalent area of the data that are written to the storage device 30. Specifically, a block size is enlarged to enable the flag to be stored, the flag indicating whether the data is any one of the storage target data up to the (N−1)th data; and the processes in step S105 and S110 (FIG. 4) are configured as processes of writing the storage target data together with the flag. Further, the process in step S306 (FIG. 10) is set as a process of dealing with the data, from which the flag is removed, being read from the storage device 30 (storage) as read target data. With this setting, the post-processing (FIG. 12) can be configured as a process of performing the overlap elimination by determining whether the data is any one of the storage target data up to the (N−1)th data without reading the information from the block map 21. More specifically, the post-processing (FIG. 12) can be configured as a process of reading the data sequentially from the storage device 30, and executing the processes from step S404 onward about the data attached with the flag indicating whether the data is any one of the storage target data up to the (N−1)th data.

The storage control apparatus 10 may also be modified as a dedicated device or integral with the storage device 30. The storage control apparatus 10 may further be modified as an apparatus used by being connected to the storage device 30 (the storage device 30 configured so that the logical block address is translated into the physical block address inside) to be accessed by using the logical block address (LBA). Note that this modification can be attained simply by using the LBA of the storage device 30 as a substitute for the PBA.

The overlap counter 20 may also be modified into an element other than some Bloom filters BF, e.g., a table for storing the hash value for authentication and the overlap count. Furthermore, the storage control program 18 may be recorded on a non-transitory portable recording medium instanced by a flexible disk, a CD-ROM (Compact Disc-Read Only Memory) and other equivalent mediums, and may be thus distributed.

The technology described above enables augmentation of the reduction quantity per unit management data size.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage control apparatus configured to control a storage device, the storage control apparatus comprising:
   a memory configured to retain associative relation information for managing an associative relation between a hash value associated with a first address being inputted and a second address as an address of the storage device, filter information containing Bloom filters, and overlap count management information for managing an overlap count of respective sets of data stored in the storage device; and
   a processor executing a process that causes the storage control apparatus to perform:
   incrementing the overlap count by "1" and first storing a storage target data in the storage device without being registered in the filter information when the storage target data instructed to be stored in the storage device is of a first data type representing data with the overlap count being smaller than "N" (N is a natural number), the overlap count being specified by the overlap count management information;
   second storing the storage target data in the storage device as well as registering the storage target data in the filter information when the storage target data is the data with the overlap count specified by the overlap count management information being equal to or larger than "N" and is of a second data type representing data not registered in the filter information;
   performing neither registering the storage target data in the filter information nor storing the storage target data in the storage device when the storage target data is data with the overlap count specified by the overlap count management information being equal to or larger than "N" and is of a third data type representing management target data of the filter information; and
   deleting deletable data from the storage device, the deletable data being specified from among data stored in the storage device, the deletable data having a content, the content being left in the storage device when the deletable data is deleted from the storage device.

2. The storage control apparatus according to claim 1, wherein the processor further to perform updating the associative relation information to enable, when storing the storage target data into the storage device, the storage target data to be read out.

3. The storage control apparatus according to claim 1, wherein "N" is a value equal to or larger than "1",
   the overlap count management information includes an N-number of Bloom filters from a first Bloom filter to an N-th Bloom filter, and
   the processor further to perform:
   first determining the overlap count being "0" when the storage target data is data not registered in the first Bloom filter;
   second determining the overlap count is "K (1≤K)" when the storage target data is data registered in a K-number of Bloom filters from the first Bloom filter to a K-th Bloom filter, K+1 is equal to or less than "N" and the storage target data is not registered in a (K+1)th Bloom filter;
   third determining the overlap count is "N" when the storage target data is data registered in N-number of Bloom filters from the first Bloom filter to the N-th Bloom filter.

4. The storage control apparatus according to claim 1, wherein when the storage target data is written to the storage device without being registered in the filter information, the data which is stored in the storage device and has same content as the storage target data and whose overlap count is not smaller than "N" is processed as the deletable data by the deleting.

5. The storage control apparatus according to claim 1, wherein the associative relation information includes;
- a map table configured to be capable of registering a plurality of records containing the first address pertaining to a certain set of data, the second address related to this set of data, or a hash value for authentication as a hash value calculated by a predetermined algorithm from the set of data with respect to this set of data;
- an m-number (≥2) of log tables configured to be associated with data storage areas different from each other in the storage device and each of the log tables capable of registering a plurality of records each containing the hash value for authentication about a certain set of data and the second address of the unit storage area of the storage device to which the data are written; and
- the filter information configured to contain a m-number of Bloom filters associated with the mutually different data storage areas in the m-number of data storage areas associated with the m-number of log tables, the processor further to perform:
first adding, to the map table, a record containing the first type address pertaining to the storage target data and the second address of the unit storage area to which the storage target data is written when the storage target data instructed to be stored in the storage device is of the first data type representing data with the overlap count being smaller than "N" (N is a natural number) specified by the overlap count management information;
- registering the storage target data in the Bloom filter associated with the data storage area including the unit storage area to which the storage target data is written in the m-number of Bloom filters when the storage target data is the data with the overlap count specified by the overlap count management information being equal to or larger than "N" and is of the second data type representing data not registered in the filter information;
- second adding, to the map table, a record containing the first type address pertaining to the storage target data and the hash value for authentication about the storage target data; adds the hash value for authentication about the storage target data and the second address of the unit storage area to which the storage target data is written, to the log table associated with the data storage area including the unit storage area to which the storage target data is written; and
- third adding, to the map table, a record containing the first type address pertaining to the storage target data and the hash value for authentication about the storage target data when the storage target data is the data with the overlap count specified by the overlap count management information being equal to or larger than "N" and is of the third data type representing the management target data of the filter information.

6. The storage control apparatus according to claim 5, wherein the processor further to perform specifying, as the deletable data, the data with the record containing the second address being registered in the map table and with the overlap count management information indicating that the overlap count is not smaller than "N".

7. The storage control apparatus according to claim 5, wherein the filter information is a multi-layer Bloom filter including the m-number of Bloom filters as the Bloom filters at a lowest layer.

8. The storage control apparatus according to claim 1, wherein the processor further to perform repeating the deleting till the deletable data is not specified when satisfying a condition being set.

9. A control method of a storage control apparatus configured to control a storage device, the control method comprising:
retaining, in a memory included in the storage control apparatus, associative relation information for managing an associative relation between a hash value associated with a first address being inputted and a second address as an address of the storage device, filter information containing Bloom filters, and overlap count management information for managing an overlap count of respective sets of data stored in the storage device;
incrementing the overlap count by "1" and first storing a storage target data in the storage device without being registered in the filter information when the storage target data instructed to be stored in the storage device is of a first data type representing data with the overlap count being smaller than "N" (N is a natural number), the overlap count being specified by the overlap count management information;
second storing the storage target data in the storage device as well as registering the storage target data in the filter information when the storage target data is the data with the overlap count specified by the overlap count management information being equal to or larger than "N" and is of a second data type representing data not registered in the filter information;
performing neither registering the storage target data in the filter information nor storing the storage target data in the storage device when the storage target data is data with the overlap count specified by the overlap count management information being equal to or larger than "N" and is of a third data type representing management target data of the filter information; and
deleting deletable data from the storage device, the deletable data being specified from among data stored in the storage device, the deletable data having a content, the content being left in the storage device when the deletable data is deleted from the storage device.

10. A non-transitory computer-readable recording medium having stored therein a control program of a storage control apparatus configured to control a storage device, the storage control apparatus including a processor, the control program to cause the processor to perform:
retaining, in a memory included in the storage control apparatus, associative relation information for managing an associative relation between a hash value associated with a first address being inputted and a second address as an address of the storage device, filter information containing Bloom filters, and overlap count management information for managing an overlap count of respective sets of data stored in the storage device;
incrementing the overlap count by "1" and first storing a storage target data in the storage device without being registered in the filter information when the storage target data instructed to be stored in the storage device is of a first data type representing data with the overlap count being smaller than "N" (N is a natural number), the overlap count being specified by the overlap count management information;

second storing the storage target data in the storage device as well as registering the storage target data in the filter information when the storage target data is the data with the overlap count specified by the overlap count management information being equal to or larger than "N" and is of a second data type representing data not registered in the filter information;

performing neither registering the storage target data in the filter information nor storing the storage target data in the storage device when the storage target data is data with the overlap count specified by the overlap count management information being equal to or larger than "N" and is of a third data type representing management target data of the filter information; and deleting deletable data from the storage device, the deletable data being specified from among data stored in the storage device, the deletable data having a content, the content being left in the storage device when the deletable data is deleted from the storage device.

* * * * *